UNITED STATES PATENT OFFICE 2,609,377

RING A AROMATIZED STEROIDAL COMPOUNDS AND PROCESS FOR PREPARING THEM

Maximilian R. Ehrenstein, Philadelphia, Pa., assignor to The Trustees of The University of Pennsylvania, Philadelphia, Pa., a corporation of Pennsylvania No Drawing. Application May 26, 1950, Serial No. 164,634

2 Claims. (Cl. 260—397.1)

The present invention relates to the preparation of ring A aromatized steroidal compounds, and more particularly to the preparation of estratriene compounds, which have a physiological activity similar to the estrogenic hormones. The present invention involves a novel method of preparing compounds of this type, and the new compounds obtained by this process.

It is, therefore, a general object of the present invention to provide an improved process for the preparation of estratriene compounds, and a specific object to provide a process whereby the aromatization of ring A of a steroidal compound can be effected under mild conditions. A further object is to provide new compounds having estrogen-like activity.

Broadly, the invention involves the preparation of compounds having the general formula

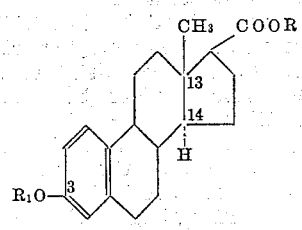

wherein R is an esterifying radical such as an alkyl, aralkyl or aryl radical; and $R_1$ is hydrogen or an acyl radical, and particularly those compounds wherein R is a lower alkyl radical, such as the methyl, ethyl, propyl, butyl, amyl and the like radicals; and $R_1$ is derived from a low molecular weight fatty acid, such as acetic acid, by either treating $3(\beta),5,19$-trihydroxyetiochloanate with Raney nickel under mild conditions or by subjecting $3(\beta),19$-diacetoxy-5-hydroxyetiocholanic acid to high-vacuum distillation and hydrolyzing the estatriene thus formed to a 3-hydroxy-estratriene-17-carboxylate.

From reports of other workers in the art, it was expected that on distilling in a high vacuum, $3(\beta),19$-diacyl-5-hydroxyetiocholanic acid would undergo dehydration leading to $3(\beta),19$-diacyl-$\Delta^5$-etiocholenic acid. This assumption was further supported by the fact that $3(\beta)$-acyloxy-$\Delta^5$-etiocholenic acid can be distilled in a high vacuum without undergoing any decomposition. It was surprisingly discovered, however, that when distilled under high vacuum, $3(\beta),19$-diacyloxy-5-hydroxyetiocholanic acid yielded 3-acyloxy-$\Delta^{1,3,5,10}$-estratriene-17-carboxylic acid.

Similarly, in counter-distinction to recent reports describing the catalytic conversion of pregnenolone to progesterone, and the oxidation of additional steroids, such as cholesterol, dihydrocholesterol and epicoprostanol by the use of a special Raney nickel and cyclohexanone, it was surprisingly found that when $3(\beta),5,19$-trihydroxyetiocholanates were treated with ordinary Raney nickel and a hydrogen acceptor such as cyclohexanone, the entire group attached to the 10-position carbon atom was removed, and the A ring was completely aromatized. The result of this reaction was all the more surprising since any primary hydroxyl group at carbon atom 19 was expected to be converted to an aldehyde group, which latter group would immediately condense with the cyclohexanone, as has been described in a number of instances of the Oppenauer reaction. While the mechanism of the aromatization is not known with certainty, it is reasonable to assume that dehydrogenation occurs first at carbon atom 3 yielding the 3-keto derivative of 5,19-dihydroxy etiocholanate, which might then have been dehydrated to the 3-keto-19-hydroxy-$\Delta^4$-etiocholenate. The mechanism of the loss of carbon atom 19 is not clear. It is possible that one molecule of methanol is split off directly, or it is possible that first a dehydrogenation to an aldehyde group followed by the elimination of one molecule of formaldehyde occurs. The intermediate 3-keto-$\Delta^{1,4}$-estradiene-17-carboxylate, a dienone, will rearrange to the 3-hydroxy-$\Delta^{1:3:5,10}$-estratriene-17-carboxylate.

The aromatization of ring A by the use of ordinary Raney nickel takes place substantially as follows. The selected 3($\beta$)-5,19-trihydroxy-etiocholanate is treated with ordinary Raney nickel under mild conditions and in the presence of a ketonic hydrogen acceptor. Any phenolic odor of the reaction product indicates that part of the ketonic hydrogen acceptor has become dehydrogenated to a phenol. The latter can be removed by extraction with a solution of 2N sodium hydroxide, and the residue subjected to a chromatographic purification.

When ethyl 3($\beta$)-5,19,trihydroxyetiocholanate was used as the starting material in the above process in the presence of cyclohexanone as hydrogen acceptor, three different compounds were isolated in a pure crystalline form.

The least polar substance, melting at 115–116°, may possess the formula $C_{22}H_{32}O_4$. The compound did not give a yellow color with tetranitromethane nor did it absorb in the region between 200 and 300 millimicrons. Hence, it was probably saturated. The isolated amounts were not sufficient for a chemical investigation.

The next compound, as isolated in process of chromatographic separation, was identified as ethyl 3-hydroxy-$\Delta^{1:3:5,10}$-estratriene-17 carboxylate, melting at 176–178° (remelting at 184–186°). It is to be noted that, though this substance is a phenol, it is not soluble in a solution of 2N sodium hydroxide. The ultraviolet absorption curve of this compound, plotted as molecular extinction coefficients, was practically identical with that of a reference sample of estradiol. With tetranitromethane the substance gave an orange color. Saponification of this compound yielded 3-hydroxy-$\Delta^{1:3:5,10}$-estratriene-17-carboxylic acid, melting point 266–270°.

The aromatization of ring A by vacuum distillation of 3($\beta$),19-diacetoxy-5-hydroxyetiocholanic acid is representative of this means of forming a benzenoid ring A. Vacuum distillation of this compound yielded a small amount of 3($\beta$),19-diacetoxy-$\Delta^5$-etiocholenic acid in the form of the crystalline methyl ester melting at 143–144°. A large part of the material underwent a more extensive decomposition. The reaction product was crystallized from ether and then purified by chromatography. The resinous material obtained from the early eluates was subjected to a solvolysis under mild conditions with the purpose of achieving a deacetylation. Subsequent renewed chromatographic separation yielded a very small amount of a crystalline fraction melting at 217–219°, whose ultraviolet absorption spectrum was determined in the region between 200 and 300 millimicrons. There was a maximum at 281 millimicrons and a minimum at 249 millimicrons. This is characteristic for the series of natural estrogens in which ring A of the steroid nucleus is aromatic. Hence it was suspected that the compound was methyl 3-hydroxy-$\Delta^{1:3:5,10}$-estratriene-17-carboxylate. The determination of a mixed melting point proved the identity of this compound with a sample of the same compound which has recently been prepared by Djerassi and Scholz from methyl 3-keto-$\Delta^{1:4}$-etiocholadienate which in turn has been synthesized from cholesterol.

The invention may be more readily understood by a consideration of the following illustrative examples wherein all temperatures are expressed in degrees centigrade. It is to be understood, of course, the invention is not limited, but merely illustrated thereby.

*Example I—Treatment of ethyl 3($\beta$),5,19-trihydroxyetiocholanate with ordinary Raney nickel in the presence of cyclohexanone.*—To a total of 0.503 g. of pure ethyl 3($\beta$),5,19-trihydroxy-etiocholanate (melting between 185 and 187°), dissolved in 5 cc. of redistilled cyclohexanone (boiling point 148–150°), was added a suspension of approximately 2.12 g. of ordinary Raney nickel in 20.5 cc. of toluene. This mixture was stirred and refluxed continuously for a period of twenty-four hours, the bath temperature being kept at 128–132°. Because part of the solvent had evaporated, 5 cc. of toluene each were added after eighteen and twenty-two hours respectively. After the termination of the reaction the solution was filtered from the Raney nickel and the latter washed with acetone. The filtrate was freed from solvents by first distilling it in an ordinary and finally in an oil pump vacuum (both at a temperature of 75°). The oily residue had a strong phenolic odor. In order to remove any phenol present, the residue was dissolved in 200 cc. of redistilled ether and this solution washed successively twice with 10 cc. portions of 2N sodium hydroxide and six times with 5 cc. portions of water. After the drying with sodium sulfate the ether solution was brought to dryness, eventually in an oil pump vacuum. The residue was a slightly yellow clear resin which resisted attempts at crystallization; weight 0.498 g.

The residue was dissolved in a mixture of 20 cc. of benzene and 20 cc. of petroleum ether which was chromatographed over a column (diameter: 2.5 cm.) of 15 grams of alkali free aluminum oxide (prepared by placing one part of aluminum oxide in an adsorption column, and then slowly washing with two parts of a 9:1 mixture of methanol-glacial acetic acid, then washed acid free with methanol, and subsequently dried in an oven at a temperature of 200° for a period of four hours). The absorbed material was eluted successively with 40 cc. portions of mixtures of benzene and petroleum ether (benzene content gradually increasing); benzene; mixtures of benzene and ether (ether content gradually increasing); ether; mixtures of ether and chloroform (chloroform content gradually increasing); chloroform; mixtures of chloroform and methanol (methanol content gradually increasing); and finally methanol. A total of 0.495 g. of material was recovered. The major part of the material (0.430 g.) was contained in the eluates of benzene-petroleum ether, benzene, and benzene-ether. Though the residues were partly crystalline, apparently no efficient separation had been achieved. One of the chloroform-methanol (39:1) eluates furnished 7.1 mg. of a crystalline residue, which yielded needle-shaped crystals from acetone: melting point 209–211°. They were not further investigated. The test with tetranitromethane yielded no yellow color. This substance gave a depression of the melting point when mixed with ethyl 19-oxo-3($\beta$),5-dihydroxyetiocholanate.

The major part of the material (0.430 g.) was subjected to a renewed chromatographic separation, for which it was dissolved in a mixture of 15 cc. of benzene and 25 cc. of petroleum ether. The solution was filtered through a column (diameter 25 mm.) of 14 g. of alkali free aluminum oxide, prepared as described above, within a period of thirty minutes. The eluates were passed through, each within about fifteen minutes.

Chromatographic fractionation

| No. of fraction | Solvent | Weight of residue grams | Appearance of residue |
|---|---|---|---|
| 1 | 15 cc. benzene+25 cc. petr. ether (original solution). | 0.0047 | Greasy. |
| 2 | 15 cc. benzene+25 cc. petr. ether | 0.0361 | Resinous. |
| 3 | 20 cc. benzene+20 cc. petr. ether | 0.0601 | Crystalline. |
| 4 | 20 cc. benzene+20 cc. petr. ether | 0.0222 | Do. |
| 5 | 25 cc. benzene+15 cc. petr. ether | 0.0207 | Resinous. |
| 6 | 25 cc. benzene+15 cc. petr. ether | 0.0295 | Pt. cryst., pt. resinous. |
| 7 | 30 cc. benzene+10 cc. petr. ether | 0.0361 | Essentially crystalline. |
| 8 | 30 cc. benzene+10 cc. petr. ether | 0.0204 | Crystalline. |
| 9 | 35 cc. benzene+5 cc. petr. ether | 0.0200 | Essentially crystalline. |
| 10 | 35 cc. benzene+5 cc. petr. ether | 0.0224 | Few cryst. centers. |
| 11 | 40 cc. benzene | 0.0104 | Resinous. |
| 12 | 40 cc. benzene | 0.0113 | Do. |
| 13 | 38 cc. benzene+2 cc. ether | 0.0166 | Do |
| 14 | 37 cc. benzene+3 cc. ether | 0.0175 | Pt. cryst., pt. resinous. |
| 15 | 36 cc. benzene+4 cc. ether | 0.0147 | Essentially crystalline. |
| 16 | 35 cc. benzene+5 cc. ether | 0.0136 | Pt. cryst., pt. resinous. |
| 17 | 34 cc. benzene+6 cc. ether | 0.0132 | Do. |
| 18 | 33 cc. benzene+7 cc. ether | 0.0119 | Do. |
| 19 | 32 cc. benzene+8 cc. ether | 0.0106 | Do. |
| 20 | 31 cc. benzene+9 cc. ether | 0.0071 | Do. |
| 21 | 30 cc. benzene+10 cc. ether | 0.0053 | Resinous. |
| 22–32 | 40 cc. each of benzene-ether mixtures; ether content gradually increasing. | 0.0160 | Do. |
| 33 | 40 cc. ether | 0.0023 | Greasy. |
| 34–38 | 40 cc. each of ether-methanol mixtures; methanol content gradually increasing. | 0.0165 | Resinous. |
| 39 | 40 cc. methanol | 0.0090 | Crystalline. |
| | Total | 0.4482 | |

The above chromatogram suggested the presence of at least three different substances.

*Compound* $C_{22}H_{32}O_4$.—Fractions 1 and 2 resisted attempts at crystallization. Fractions 3 and 4 were separately recrystallized by dissolving them in a small volume of ether to which petroleum ether was added. This caused the immediate separation of rosette arrangements of long, thin needles. Several crystalline fractions, totalling 30.6 mg., with melting points varying between 97 and 114°, were repeatedly recrystallized. Eventually five crystalline fractions resulted, totalling 17.6 mg. and melting between 111 and 116°. The determination of mixed melting points established the identity of these fractions and hence the combined material was subjected to a renewed recrystallization from equal amounts of ether and petroleum ether: First crop; weight 10.6 mg.; melting point, 115–116°. Second crop; weight 1.3 mg.; melting point, 111–113°. Third crop; weight 0.9 mg.; melting point, 114.5–115.5°. Total pure material: 12.8 mg. The total yield can be somewhat increased by subjecting the mother liquors, including the chromatographic fractions 2 and 5 to a renewed chromatographic fractionation. The substance (first crop) was transparent in the region between 200 and 300 millimicrons. The test with tetranitromethane yielded no yellow color.

*Example II—Ethyl 3 - hydroxy - $\Delta^{1:3:5,10}$-estratriene - 17 - carboxylate.*—The chromatographic fraction 5 resisted attempts at crystallization. Fractions 6 to 9 were separately recrystallized by dissolving them in a small amount of ether and adding about twice the volume of petroleum ether. This caused the separation of rosettes of stout needles. Eventually 10 crystalline fractions of identical material (determined by mixed melting points), totalling 48.9 mg. with melting points between 175 and 178° (solidification and remelting between 184 and 188°) were obtained. Recrystallization of 43.7 mg. of combined material from ether-petroleum ether furnished several fractions (total: 37.5 mg.) of clusters of stout rectangular crystals which melted between 176 and 178°, then solidified and remelted between 184 and 186°. A solution of the substance in chloroform yielded with tetranitromethane an orange color. The ultraviolet absorption curve of this compound, plotted as molecular extinction coefficients, was practically identical with a reference sample of estradiol.

The mother liquors resulting from the purification of the chromatographic fractions 6 to 9 were combined with the whole fraction 10. On rechromatographing this material only an additional 2.6 mg. of pure ethyl 3-hydroxy-$\Delta^{1:3:5,10}$-estratriene-17-carboxylate was obtained.

*Example III.* — *3-hydroxy-$\Delta^{1:3:5,10}$-estratriene-17-carboxylic acid.*—6 milligrams of ethyl 3-hydroxy-$\Delta^{1:3:5,10}$-estratriene-17-carboxylate, melting at 175–177° (184–188°), was dissolved in 0.6 cc. of a 10% solution of potassium hydroxide in methanol. After refluxing this mixture for a period of four hours, 2 cc. of water was added and the methanol removed in vacuo. The solution was thereafter acidified to Congo paper by the addition of concentrated hydrochloric acid which produced a gelatinous precipitate. This was followed by extracting with four 5 cc. portions of ether and washing the combined ether extracts with 1 cc. of water, 2 cc. of a solution of N sodium carbonate and two 1 cc. portions of water. After drying with sodium sulfate, the ether phase yielded 0.9 mg. of neutral material. The carbonate phase, including the aqueous washings, was made acid to Congo paper by the addition of concentrated hydrochloric acid and the resulting precipitate brought into solution by extracting four times with 5 ccs. of ether. The combined ether phases were washed three times with 1 cc. of water, dried with sodium sulfate and brought to dryness. Thus 3.5 mg. of crystalline acid material resulted which was recrystallized from small amounts of ether from which there occurred immediate crystallization of small cubes. First crop: 1.5 mg.; melting point, 266–270° (turning dark brown). Second crop: 0.7 mg.; melting point, 266–270° (turning dark brown). This substance did not give a depression of the melting point when it was mixed with an authentic sample of 3-hydroxy-$\Delta^{1:3:5,10}$-estratriene-17-carboxylic acid.

The chromatographic fractions 11 and 12 were not investigated, and fraction 13 resisted attempts at crystallization.

*Compound* $C_{22}H_{34}O_4$.—Fractions 14 to 20 yielded identical material which crystallized from ether in rosettes of long, stout, rectangular prisms. Eleven crystalline fractions, totalling 41.8 mg., had melting points between 134 and 137°. 6 fractions, totalling 12.0 mg., yielded melting points between 128–133°. Renewed crystallization of either combined group raised the melting point to 136–137°. The substance was transparent in the region between 200 and 300 millimicrons. The test with tetranitromethane gave no yellow color. $[\alpha]_D^{26.0} +69.8°$ (7.4 mg. in 2.0 cc. of chloroform).

While the above examples illustrate the aromatization of ring A of the ethyl ester of $3(\beta),5,19$-trihydroxyetiocholanic acid, it is to be understood any other ester form could be used in place of the ethyl ester, such as any other alkyl ester as the methyl, propyl, amyl, and the like ester; or an aryl ester, as the phenyl ester, and the like; or an aralkyl ester, as benzyl, and the like. Likewise, the $3(\beta),5,19$-trihydroxy etiocholanate starting material may contain additional nuclear substituents so long as they do not interfere with the catalytic aromatization of ring A.

Also, the cyclohexanone used as a hydrogen acceptor may be replaced by other ketonic hydrogen acceptors provided they are liquid compounds having a relatively high boiling point. As examples of other suitable ketone hydrogen acceptors may be mentioned tetrachlorocyclohexanone, methyl cyclohexanone as the 2-methyl-, 3-methyl-, or 4-methyl-cyclohexanone; ethyl cyclohexanone; 3,4,5-trimethyl- or 3,5,5-trimethylcyclohexanone. Other suitable hydrogen acceptors will readily suggest themselves to those skilled in this art.

The following examples illustrate the aromatization of ring A by high-vacuum distillation.

*Example IV.—Methyl 3-hydroxy-$\Delta^{1:3:5,10}$-estratriene-17-carboxylate.*—First experiment: A total of 0.287 gram of dry $3(\beta),19$-diacetoxy-5-hydroxyetiocholanic acid was heated in a vacuum (oil pump) to 170° and the temperature gradually raised to 205°. During this time there was a persistent gas evolution in the retort. After this reaction had ceased, the reaction product was distilled in a high-vacuum (oil and mercury vapor pumps combined) at a temperature of 240–265°. The distillate was a slightly greenish glass; weight: 0.234 gram; $[\alpha]_D^{26} +3.3°$ (20.0 mg. in 2.0 cc. of chloroform). The residue in the retort was a light brown resin; weight: 0.005 gram. Total loss of weight: 0.048 gram (16.7%). The distillate resisted attempts at recrystallization. A sample was subjected to a separation into acid and neutral material; only small amounts of neutral material were obtained. The distillate was transformed into the methyl ester by means of diazomethane in an ethereal solution; 0.215 gram of distillate yielded 2.225 gram of methyl ester. The latter was a colorless glass which was dissolved in a mixture of 25 cc. of benzene and 7.5 cc. of petroleum ether and chromatographed over 10.0 g. of aluminum oxide (diameter of column: 20 mm.). The adsorbate was successively eluted with 25 cc. portions of benzene-petroleum ether (benzene content gradually increasing); benzene; benzene-ether (ether content gradually increasing); ether; ether-methanol (methanol content gradually increasing). A substantial amount (0.052 gram) was recovered from the benzene-petroleum ether fractions. One of them (0.023 gram) was crystalline. Recrystallization from ether yielded several crystalline crops, totalling 12.4 mg. with melting points between 133 and 144°. The melting point of the purest fraction (4.9 mg.) was 143–144° and represented methyl $3(\beta),19$-diacetoxy-$\Delta^5$-etiocholanate. A solution in chloroform yielded a yellow color with tetranitromethane.

Second experiment: A total of 0.657 gram of $3(\beta),19$-diacetoxy-5-hydroxyetiocholanic acid was quickly heated in a high-vacuum (oil and mercury vapor pumps combined) to a temperature of 153° which was then slowly raised to 176°. After the gas evolution had ceased, the material was distilled at a temperature of about 250°. Total loss of weight: 0.124 grams (18.8%). The glassy distillate was recrystallized from ether. This furnished several crops of rosette arrangements of crystals totalling 0.138 gram; melting point between 144 and 150°. The weight of the non-crystalline part was 0.372 gram. Recrystallization of the combined crystalline fractions from ether furnished several crops of crystals with varying melting points; weight of the first crop: 0.041 gram; melting point, 158–161°.

The crystalline material was transformed into the methyl ester by means of diazomethane. The resulting resinous product was purified by chromatographic fractionation.

From a total of 100 mg. of crude methyl ester, about 36 mg. could be recovered from the early eluates (benzene-petroleum ether combinations). This material, which was resinous, was subjected to solvolysis with 0.5 equiv. potassium hydroxide in methanol at room temperature. This was done with the purpose of transforming any acetoxy groups into hydroxy groups. The resulting non-crystalline product was purified by chromatographic fractionation. As expected it had become more polar. After first eluting with benzene-petroleum ether combinations and with benzene, approximately 11 mg. could be secured from the benzene-ether eluates. On recrystallizing from a mixture of acetone and petroleum ether, 1.6 mg. of feather-shaped crystals of methyl 3-hydroxy-$\Delta^{1:3:5,10}$-estratriene-17-carboxylate, melting point 217–219°, was obtained. A solution in chloroform gave, with tetranitromethane, a deep golden-yellow color. The ultraviolet absorption spectrum was determined in the region between 200 and 300 millimicrons. There was a maximum at 281 millimicrons and a minimum at 249 millimicrons. There was no depression of the melting point when mixed with an authentic sample of methyl 3-hydroxy-$\Delta^{1:3:5,10}$-estratriene-17-carboxylate.

Of course, many changes and variations can be made in the reaction conditions described above. For example, in place of the $3(\beta),19$-diacetoxy-5-hydroxyetiocholanic acid starting material other cholanic acid derivatives may be used so long as the 3- and 19-hydroxy groups are protected as by actylating with other suitable derivatives of aliphatic or aromatic carboxylic acids.

Likewise, the 17-carboxylic acid radical may be esterified by other well known esterifying agents, and the subsequent deacylation of the 3- and 19-positions may be effected by other reagents, such as alcoholic sodium hydroxide and the like.

The amounts of the various agents and the type and amount of solvents used in carrying out this invention, the temperatures employed and other reaction conditions may be varied within the limits obvious to those skilled in this art.

The aromatization of ring A of steroid compounds by either of the processes described above makes possible, for the first time, a means for obtaining from strophanthidin new compounds of the estrane type. Thus, a correlation between the cardiac aglycones and the hormones of the estrogen series has now been established.

It will be understood, with reference to the various compounds illustrated and described in this specification and its claims, that I do not intend that the invention of any of the compounds described or claimed shall be limited to any particular stereo-chemical configuration about any carbon atom and, in particular, about carbon atoms 3, 5, 10, 14 and 17.

What I claim is:

1. A process for preparing compounds having the general formula

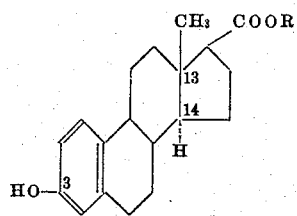

wherein R is a lower alkyl radical, by aromatizing an ester of 3(β),5,19-trihydroxy etiocholanic acid with ordinary Raney nickel in the presence of a ketonic hydrogen acceptor.

2. A process as claimed in claim 1, wherein the ketonic hydrogen acceptor is cyclohexanone.

MAXIMILIAN R. EHRENSTEIN.

REFERENCES CITED

The following references are of record in the file of this patent:

Djerassi: Jour. Am. Chem. Soc. 69, 2404–2410 (1947).